US012756048B2

(12) United States Patent
Rhee et al.

(10) Patent No.: US 12,756,048 B2
(45) **Date of Patent: *Oct. 6, 2026**

(54) BATTERY CELL STACK AND MANUFACTURING METHOD THEREOF

(71) Applicant: SK On Co., Ltd., Seoul (KR)

(72) Inventors: Seo Roh Rhee, Daejeon (KR); Ji San Kim, Daejeon (KR); Chi Min Park, Daejeon (KR); Tak Kyung Yoo, Daejeon (KR)

(73) Assignee: SK On Co., Ltd., Seoul (KR)

( * ) Notice: Subject to any disclaimer, the term of this patent is extended or adjusted under 35 U.S.C. 154(b) by 717 days.

This patent is subject to a terminal disclaimer.

(21) Appl. No.: 17/982,599

(22) Filed: Nov. 8, 2022

(65) Prior Publication Data

US 2024/0120594 A1 Apr. 11, 2024

(30) Foreign Application Priority Data

Nov. 9, 2021 (KR) ........................ 10-2021-0153336
Oct. 6, 2022 (KR) ........................ 10-2022-0128042

(51) Int. Cl.
*H01M 50/24* (2021.01)
*C09J 7/38* (2018.01)
(Continued)

(52) U.S. Cl.
CPC ............. *H01M 50/24* (2021.01); *C09J 7/387* (2018.01); *C09J 11/04* (2013.01); *C09J 11/06* (2013.01);
(Continued)

(58) Field of Classification Search
None
See application file for complete search history.

(56) References Cited

U.S. PATENT DOCUMENTS

2011/0212361 A1 9/2011 Kim et al.
2020/0006726 A1 1/2020 Shin et al.
(Continued)

FOREIGN PATENT DOCUMENTS

KR 10-20170113466 10/2017
KR 10-2021-0000551 1/2021
(Continued)

OTHER PUBLICATIONS

European Patent Office, Appl. 22206210.1, Extended European Search Report, Apr. 6, 2023.
(Continued)

*Primary Examiner* — Maria Laios
(74) *Attorney, Agent, or Firm* — Jones Day

(57) ABSTRACT

A battery cell stack of the present invention includes a plurality of battery cells and a resin layer wholly or partially in contact with an outer surface of at least one of the plurality of battery cells, wherein the resin layer includes a solvent-free adhesive and a flame retardant, and has a peel strength of 1,000 gf/in to 3,000 gf/in measured according to ASTM D3330, and a shear strength of 20 kgf/sq-in to 100 kgf/sq-in measured according to ASTM D1002, and the flame retardant includes one or more of a phosphorus-based flame retardant and a nitrogen-based flame retardant, such that the operational stability and flame retardancy may be simultaneously improved, while simplifying materials and processes necessary to manufacture the battery cell stack.

13 Claims, 2 Drawing Sheets

100

(51) Int. Cl.
*C09J 11/04* (2006.01)
*C09J 11/06* (2006.01)
*H01M 50/293* (2021.01)

(52) U.S. Cl.
CPC ....... *H01M 50/293* (2021.01); *C09J 2203/33* (2013.01); *C09J 2301/408* (2020.08); *C09J 2453/00* (2013.01); *C09J 2491/00* (2013.01); *C09J 2493/00* (2013.01)

(56) References Cited

U.S. PATENT DOCUMENTS

2020/0144573 A1* 5/2020 Park .................... H01M 10/658
2022/0069377 A1* 3/2022 Rhee ................... H01M 10/658
2022/0158270 A1* 5/2022 Lee ..................... H01M 10/647
2023/0238600 A1* 7/2023 Rathod ............. H01M 10/6551
429/120

FOREIGN PATENT DOCUMENTS

KR 10-2021-0020665 A 2/2021
KR 10-2021-0029121 A 3/2021
WO WO-2020262832 A1 * 12/2020 ........ H01M 10/6551

OTHER PUBLICATIONS

AMETEK Brookfield, 2024, Hot Melt Adhesives Viscosity Analysis.
ASTM International, 1999, Standard Test Method for Apparent Viscosity of Hot Melt Adhesives and Coating Materials (Reapproved).
ASTM International, 1999, Standard Test Method for Apparent Viscosity of Hot Melt Adhesives and Coating Materials.
KIPO, Appl. 10-2022-0128042, Office Action, Aug. 18, 2026.

* cited by examiner

[FIG. 1]
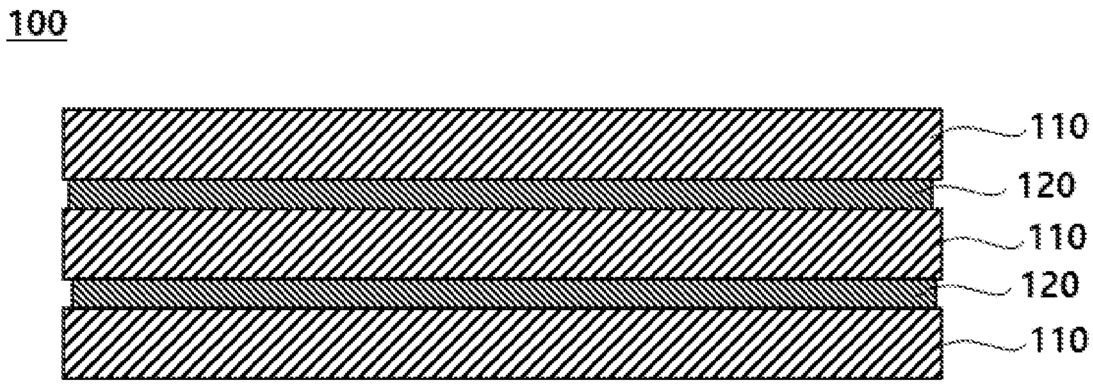
[FIG. 2]
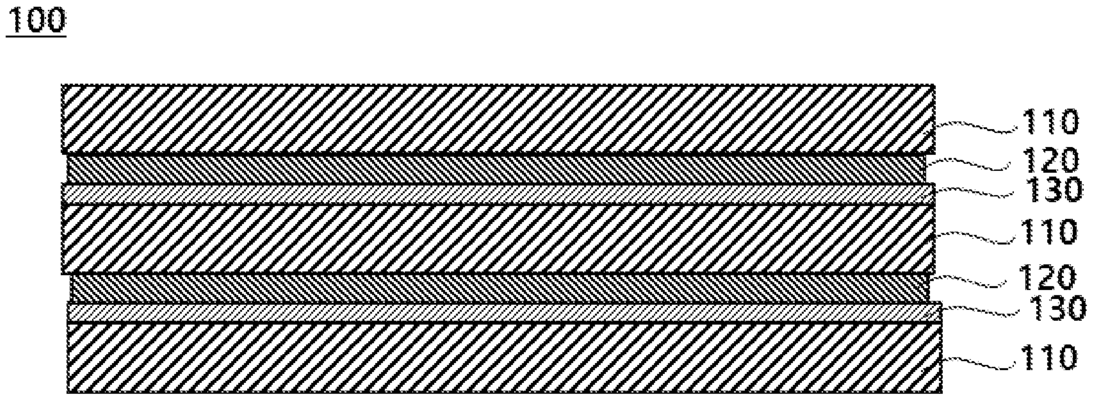

[FIG. 3]
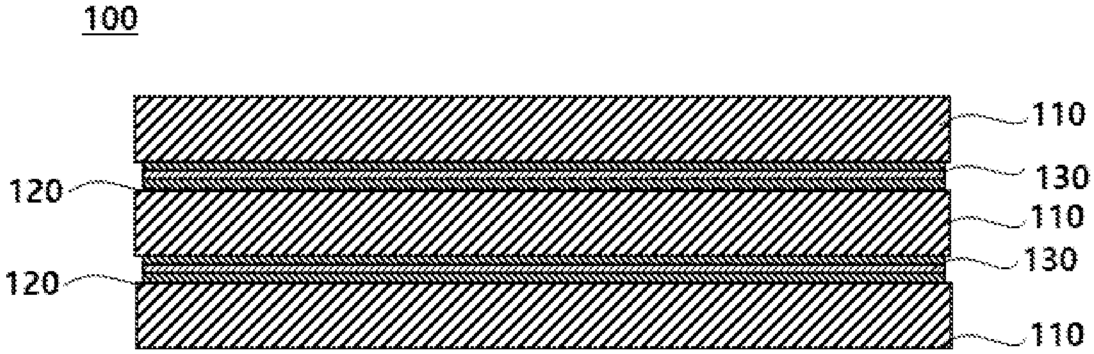

BATTERY CELL STACK AND MANUFACTURING METHOD THEREOF

BACKGROUND OF THE INVENTION

1. Field of the Invention

The present invention relates to a battery cell stack and a method of manufacturing the same.

2. Description of the Related Art

Research into a rechargeable secondary battery capable of being charged and discharged has been actively conducted in accordance with the development of state-of-the-art fields such as a digital camera, a cellular phone, a laptop computer, a hybrid automobile and the like. Examples of the secondary battery may include a nickel-cadmium battery, a nickel-metal hydride battery, a nickel-hydrogen battery, and a lithium secondary battery. Among them, since the lithium secondary batteries have a high operating voltage and excellent energy density characteristics per unit weight, they are used as a power source for portable electronic devices. Alternately, a plurality of lithium secondary batteries are connected in series, and then used in a high-output hybrid vehicle or an electric vehicle.

When used in the high-output hybrid vehicle or electric vehicle, in order to increase capacity and output of the secondary battery, a plurality of secondary batteries may be connected and used in a form of one battery module and a battery pack. In order to configure the above-described battery module or battery pack, various fastening parts or cooling equipment are required. However, these fastening parts or cooling equipment cause an increase in manufacturing costs while increasing volume and weight thereof, and also lead to a decrease in output in proportion to the increased volume and weight.

A method of manufacturing a cell stack constituting a battery module by attaching a tape type adhesive to cell surfaces is also used. However, processes and equipment for inputting the tape and removing a release paper are complicated, and waste such as release paper may be generated in large quantities during manufacturing the battery module.

In addition, since the battery module is increasingly being composed of a plurality of battery cells having high capacity and high output, when a fire occurs, it is not easy to extinguish the fire due to characteristics thereof.

PRIOR ART DOCUMENT

Patent Document

Korean Patent Laid-Open Publication No. 10-2021-0029121

SUMMARY OF THE INVENTION

An object of embodiments of the present invention is to provide a battery cell stack, which includes a solvent-free adhesive applied to a resin layer, such that materials and processes necessary to manufacture the cell stack are simplified, and the resin layer includes at least one of a phosphorus-based flame retardant and a nitrogen-based flame retardant, such that operational stability and flame retardancy are simultaneously improved, and a method of manufacturing the same.

To achieve the above object, according to an aspect of the present invention, there is provided a battery cell stack including: a plurality of battery cells; and a resin layer which is wholly or partially in contact with an outer surface of at least one of the plurality of battery cells, wherein the resin layer includes a solvent-free adhesive and a flame retardant.

In some embodiments, the resin layer may have a peel strength of 1,000 gf/in to 3,000 gf/in measured according to ASTM D3330.

In some embodiments, the resin layer may have a shear strength of 20 kgf/sq-in to 100 kgf/sq-in measured according to ASTM D1002.

In some embodiments, the flame retardant may include at least one of a phosphorus-based flame retardant and a nitrogen-based flame retardant.

In some embodiments, the phosphorus-based flame retardant may include a phosphate compound, a phosphonate compound, a phosphinate compound, a phosphine oxide compound, a phosphazene compound, and metal salts thereof.

In some embodiments, the nitrogen-based flame retardant may include one or more selected from the group consisting of melamine and melamine derivatives.

In some embodiments, the phosphorus-based flame retardant may be included in a ratio of 10 to 50 parts by weight based on 100 parts by weight of the resin layer.

In some embodiments, the solvent-free adhesive may include one or more selected from the group consisting of an ethylene vinyl acetate resin, polyamide resin, fatty acid polyamide resin, polyester resin, polyurethane resin, polyolefin resin, styrene resin, and rubber resin.

In some embodiments, the solvent-free adhesive may be a pressure sensitive adhesive (PSA).

In some embodiments, the resin layer may have a viscosity of 2,000 cps to 18,500 cps at 160° C.

In some embodiments, the battery cell stack may further include a functional layer disposed between the plurality of battery cells, and the resin layer may be wholly or partially in contact with the functional layer.

In some embodiments, the functional layer may include one more selected from the group consisting of aerogel, talc, kaolin, alumina, feldspar, pyrophyllite, sericite, mica, elvan, bentonite, sepiolite, diatomite, perlite, fumed silica, silica, glass bubble, glass bead, magnesium hydroxide, calcium carbide, glass fibers, glass wool, rock wool, ceramic wool, nylon, aramid fibers, carbon fibers, polypropylene fibers, polyethylene fibers, polyester fibers, polyurethane fibers, acrylic fibers, polyvinyl chloride acetate fibers, and rayon fibers.

According to another aspect of the present invention, there is provided a method of manufacturing a battery cell stack, which includes: applying a resin layer including a solvent-free adhesive and a phosphorus-based flame retardant to bring it into wholly or partially contact therewith; and stacking additional battery cells on the resin layer.

In some embodiments, the resin layer may have a peel strength of 1,000 gf/in to 3,000 gf/in measured according to ASTM D3330.

In some embodiments, the resin layer may have a shear strength of 20 kgf/sq-in to 100 kgf/sq-in measured according to ASTM D1002.

In some embodiments, the resin layer may be applied by spray coating or slot die coating.

In some embodiments, the application of the resin layer may be performed at 140 to 200° C.

In some embodiments, the thickness of the resin layer may be 0.01 to 0.10 mm.

BRIEF DESCRIPTION OF THE DRAWINGS

The above and other objects, features and other advantages of the present invention will be more clearly understood from the following detailed description taken in conjunction with the accompanying drawings, in which:

FIG. 1 is a schematic view of a battery cell stack according to an exemplary embodiment;

FIG. 2 is a schematic view of a battery cell stack according to another exemplary embodiment; and FIG. 3 is a schematic view of a battery cell stack according to yet another exemplary embodiment.

DETAILED DESCRIPTION OF THE INVENTION

In descriptions of the embodiments of the present invention, publicly known techniques that are judged to be able to make the purport of the present invention unnecessarily obscure will not be described in detail. Referring to the drawings, wherein like reference characters designate like or corresponding parts throughout the several views. In addition, the terms as used herein are defined by taking functions of the present invention into account and may be changed according to the custom or intention of users or operators. Therefore, definition of the terms should be made according to the overall disclosure set forth herein.

It should be understood that the technical spirit and scope of the present invention are defined by the appended claims, and the following embodiments are only made to efficiently describe the present invention to persons having common knowledge in the technical field to which the present invention pertains.

As used herein, the term "resin layer" refers to a layer including a resin component. The resin layer may be an adhesion layer or an adhesive layer.

As used herein, the term "solvent-free adhesive" refers to a thermoplastic adhesive which is made of a thermoplastic resin without using a solvent or other solvents, and is capable of being melted at a melting point or more, and then solidified by cooling. The solvent-free adhesive is a hot-melt adhesive which is applied to a subject to be adhered in a liquid state at a high temperature, and exhibits an adhesive force by dissipating heat to the surface of the subject to be adhered and surroundings after compression, while cooling and solidifying within a few seconds.

As used herein, the term "pressure sensitive adhesive (PSA)" refers to an adhesive on which an adhesive material acts when applying pressure on the adhesive so as to adhere it to an adhesive surface.

Hereinafter, specific embodiments of the present invention will be described with reference to the accompanying drawings. However, these are merely illustrative examples and the present invention is not limited thereto.

A battery cell stack according to an embodiment of the present invention may be widely used in various devices requiring electricity storage, such as an energy storage system (ESS) as well as a vehicle.

FIGS. 1 to 3 are schematic views of a battery cell stack according to exemplary embodiments, respectively.

Referring to FIG. 1, a battery cell stack 100 according to an embodiment of the present invention may include a plurality of battery cells 110 and a resin layer 120 wholly or partially in contact an outer surface of at least one of the plurality of battery cells. The battery cell stack 100 is configured by stacking the plurality of battery cells 110. The battery cells 110 may be vertically erected and stacked in a left-and-right direction (i.e., in a horizontal direction), but may be horizontally laid down and stacked in an up-and-down direction (i.e., in a vertical direction) as necessary.

The battery cell 110 according to an embodiment of the present invention is a general battery cell. The battery cell 110 according to an embodiment of the present invention may be configured in a form in which an electrode assembly and an electrolyte are accommodated in a pouch. The electrode assembly includes a plurality of electrode plates and electrode tabs, and is accommodated in the pouch. Herein, the electrode plate includes a cathode plate and an anode plate, and the electrode assembly may be configured in a stacked form so that the cathode plate and the anode plate have wide surfaces facing each other with a separator interposed therebetween.

The battery cell 110 may be fixed by the resin layer 120. For example, the resin layer 120 may be formed on the outer surface of the battery cell 110 to be mutually fixed to the battery cell 110 adjacent thereto. That is, the battery cells 110 may be fixed to each other due to the resin layer 120 formed between the battery cell 110 and the battery cell 110. The resin layer 120 may be formed as an adhesive layer. In addition, the resin layer 120 may be wholly or partially applied to the surface of the battery cell 110. As the battery cells 110 and the resin layers 120 are repeatedly disposed, the battery cells 110 may be wholly or partially fixed to each other through the resin layer 120.

In one exemplary embodiment, the resin layer 120 includes a solvent-free adhesive material, preferably a pressure sensitive adhesive (PSA) material, and more preferably a solvent-free or hot-melt coatable pressure sensitive adhesive.

In specific embodiment, the solvent-free adhesive may include one or more selected from the group consisting of an ethylene vinyl acetate resin, polyamide resin, fatty acid polyamide resin, polyester resin, polyurethane resin, polyolefin resin, styrene resin, and rubber resin.

In exemplary embodiments, the resin layer 120 may include a flame retardant. Since the resin layer 120 including the solvent-free adhesive may be applied by spray coating or slot die coating, in order to exhibit effective flame retardancy while simultaneously exhibiting suitable properties, the flame retardant preferably includes at least one of a phosphorus-based flame retardant and a nitrogen-based flame retardant.

In one exemplary embodiment, the phosphorus-based flame retardant may include a phosphate compound, a phosphonate compound, a phosphinate compound, a phosphine oxide compound, a phosphazene compound, or metal salts thereof and the like. These compounds may be used alone or in combination of two or more thereof.

In a specific embodiment, the phosphorus-based flame retardant may include diphenyl phosphate, diaryl phosphate, triphenyl phosphate, tricresyl phosphate, trizyrenyl phosphate, tri(2,6-dimethylphenyl)phosphate, tri(2,4,6-tri methylphenyl)phosphate, tri(2,4-di-tert-butylphenyl)phosphate, tri(2,6-dimethylphenyl)phosphate, bisphenol-A bis(diphenylphosphate), resorcinol bis(diphenylphosphate), resorcinol bis[bis(2,6-dimethylphenyl)phosphate], resorcinol bis[bis(2,4-di-tert-butylphenyl)phosphate], hydroquinone bis[bis(2,6-dimethylphenyl)phosphate], hydroquinone bis[bis(2,4-di-tert-butylphenyl)phosphate], an oligomeric phosphoric acid ester compound, and the like, but it is not limited thereto. These compounds may be applied alone or in a form of mixture of two or more thereof.

In one exemplary embodiment, the nitrogen-based flame retardant may include melamine and melamine derivatives. These may be used alone or in combination of two or more thereof.

In a specific embodiment, the nitrogen-based flame retardant may include melamine, melamine phosphate, melamine cyanurate, etc., but it is not limited thereto. These may be applied alone or in a form of mixture of two or more thereof. In one exemplary embodiment, the flame retardant may be included in a ratio of 10 to 50 parts by weight based on 100 parts by weight of the resin layer. The contents of the above-described phosphorus-based flame retardant and the nitrogen-based flame retardant are preferably added and used alone or in the same proportion as each other in a sum of both retardants. If the proportion of the flame retardant is less than 10 parts by weight, the flame retardancy is insufficient, whereas if it exceeds 50 parts by weight, physical properties such as adhesive force or workability when applying the resin layer may be deteriorated.

In some embodiments, the resin layer 120 preferably has a peel strength of about 1,000 gf/in to 3,000 gf/in measured according to ASTM D3330. When the peel strength is 1,000 gf/in Or more, excellent adhesive force to various materials constituting the battery cell stack 100 may be exhibited, and the relative flow of the battery cells 110 may be prevented, thus to improve the stability of the battery module, whereas if it strength is less than 1,000 gf/in, there may be problems in that adhesion to the cell stack is deteriorated in the process of stacking the cells or an alignment between the cells is misaligned due to micro-vibrations in the process or micro-vibrations and accelerations in the shuttle process. When the peel strength is 3,000 gf/in or less, the application workability of the resin layer 120 may be maintained at an appropriate temperature, whereas if it exceeds 3,000 gf/in, reworkability may be reduced, and it becomes difficult to disassemble the battery cell stack when recycling, as well as, when a composition of the resin layer 120 is used in a solvent-free adhesive manner, a damage due to heat may be induced on the surface of the battery cell because application should be performed at a high temperature.

In some embodiments, the resin layer 120 may have a shear strength of about 20 kgf/sq-in to 100 kgf/sq-in measured according to ASTM D1002. When the shear strength is 20 kgf/sq-in or more, impact resistance of the battery cell stack 100 may be improved, whereas if it is less than 20 kgf/sq-in, there may be problems in that adhesion to the cell stack is deteriorated in the process of stacking the cells or the alignment between the cells is misaligned due to micro-vibrations in the process or micro-vibrations and accelerations in the shuttle process. When the shear strength is 100 kgf/sq-in or less, the application workability of the resin layer 120 may be maintained at an appropriate temperature, whereas if it exceeds 100 kgf/sq-in, reworkability may be reduced, and it becomes difficult to disassemble the battery cell stack when recycling, as well as, when a composition of the resin layer 120 ('resin layer 120 composition') is used in a solvent-free adhesive manner, a damage due to heat may be induced on the surface of the battery cell because application should be performed at a high temperature.

In some embodiments, the resin layer 120 may have a viscosity of about 2,000 to 18,500 cps at 160° C. In the above viscosity range, when applying the resin layer 120 to the battery cell 110 before curing, workability necessary for the process may be improved, and the stability and reliability of the battery cell stack 100 may be secured after curing.

In some embodiments, the resin layer 120 may have a softening point of about 60 to 140° C., and preferably about 80 to 95° C. In the above softening point range, when a defect occurs during manufacturing the battery cell stack 100, rework is easily performed and damage to the cell may be minimized, as well as the resin layer 120 may be easily removed when recycling the battery cell stack 100. Whereas, if the softening point is less than 60° C., the viscosity of the resin layer 120 composition is increased, such that nozzle clogging of an applicator or scattering of the resin layer 120 composition may occur when applying the resin layer, and re-liquefaction may occur in the resin layer 120 due to heat generated from the battery cell 110, and thereby causing the impact resistance of the battery cell stack 100 to weaken. If the softening point exceeds 140° C., damage due to heat may occur in the battery cell 110 when the resin layer 120 is re-liquefied.

In some embodiments, the resin layer 120 may have a withstand voltage of 10.0 kV/mm to 30 kV/mm or less measured according to ASTM D149. When the withstand voltage is 10.0 kV/mm or more, performances of the battery cell stack 100 may be maintained and stability may be secured. As the value of the withstand voltage is increased, the resin layer 120 exhibits excellent insulation, and it is not particularly limited, but considering the adhesive force of the resin layer 120 including the solvent-free adhesive, it is preferable that the withstand voltage is 30 kV/mm or less.

The resin layer 120 may be formed in a form of a relatively thin layer compared to the battery cell 110. In this case, the resin layer 120 may have a thickness within a range of 0.01 to 0.10 mm, or 0.02 to 0.08 mm, or about 0.03 to 0.05 mm, for example. If the resin layer 120 is less than 0.01 mm, a fixing force between the battery cells 110 is weakened to cause a reduction in the stability of the battery cell stack 100, whereas if it exceeds 0.10 mm, the thickness of the battery cell stack 100 may be increased, which may be disadvantageous in terms of battery module design. The thickness may be a thickness of the thinnest portion, a thickness of the thickest portion, or an average thickness of the resin layer 120.

The resin layer 120 may also be formed in a form of filling an inner space of a battery case including the battery cell stack 100. In this case, the battery cell 110 may exist in a state of being inserted into the resin layer 120.

In some embodiments, the battery cell stack 100 may further include a functional layer 130 disposed between the plurality of battery cells 110, wherein the resin layer 120 may be wholly or partially in contact with the functional layer 130. The functional layer 130 may be an insulation layer for improving electrical insulation, or may be an insulation layer for improving thermal insulation. The functional layer 130 may include a binder resin and/or particles.

Referring to FIGS. 2 and 3, a functional layer 130 may be formed by being applied to the surface of the battery cell 110, or may be formed separately in the resin layer 120. The functional layer 130 may be intended to block heat generated in the battery cell 110, or may be intended to prevent ignition of the battery.

In some embodiments, the functional layer 130 may include one more selected from the group consisting of aerogel, talc, kaolin, alumina, feldspar, pyrophyllite, sericite, mica, elvan, bentonite, sepiolite, diatomite, perlite, fumed silica, silica, glass bubble, glass bead, magnesium hydroxide, calcium carbide, glass fibers, glass wool, rock wool, ceramic wool, nylon, aramid fibers, carbon fibers, polypropylene fibers, polyethylene fibers, polyester fibers, polyurethane fibers, acrylic fibers, polyvinyl chloride acetate fibers, and rayon fibers.

A method of manufacturing a battery cell stack according to exemplary embodiments of the present invention may include: applying a resin layer including a solvent-free adhesive to outer surfaces of battery cells to bring it into wholly or partially contact therewith; and stacking additional battery cells on the resin layer.

The battery cell, the resin layer, and the solvent-free adhesive are the same as those described above, and therefore will not be described in detail.

The resin layer may be heated inside the tank of the applicator and pumped to the nozzle to be applied to the outer surface of the battery cell. In particular, since the resin layer according to the present invention contains a solvent-free adhesive, it may be applied by spray coating or slot die coating. The application of the resin layer may be performed at 140° C. to 200° C.

After application of the resin layer, an additional battery cell is stacked on the resin layer. The stacking of the additional battery cells may be continuously performed after the application of the resin layer. The method of manufacturing a battery cell stack significantly reduces the process steps and time compared to the conventional process using the tape method, and thus productivity of the battery cell stack may be greatly increased.

EXAMPLES AND COMPARATIVE EXAMPLES

Preparation of Resin Layer

An aluminum pouch (subject to be adhered) used for manufacturing the battery cell was cut into a width of about 10 mm, then a heated resin layer composition was applied to a PET surface of the pouch washed with acetone to a thickness of 50 μm using an applicator, thus to form a resin layer. As components of the resin layer composition, styrene-isoprene-styrene (SIS) resin as a basic resin, paraffin wax as a wax component, terpene resin as a tackifier resin, polybdenum as a plasticizer, calcium carbonate as a filler, and phenyl-β-naphthylamine as an antioxidant were used, and different flame retardants were added thereto to form resin layers.

Preparation of Battery Cell Stack

The resin layers were applied to battery cells whose surfaces were washed with acetone to a thickness of a thickness of 50 μm. After stacking another battery pouch on the applied resin layer, the resin layer was cured to prepare a battery cell stack.

Configurations of the resin layers of the examples and comparative examples are shown in Table 1 below.

TABLE 1

| Section | SIS (wt. parts) | Paraffin wax (wt. Parts) | Terpene resin (wt. Parts) | Plasticizer (wt. Parts) | Antioxidant (wt. Parts) | Flame retardant (wt. parts) | |
|---|---|---|---|---|---|---|---|
| Example 1 | 70 | 20 | 5 | 3 | 2 | Ammonium phosphate | 30 |
| Example 2 | 70 | 20 | 5 | 3 | 2 | Ammonium phosphate | 15 |
| | | | | | | Melamine cyanurate | 15 |
| Example 3 | 70 | 20 | 5 | 3 | 2 | Melamine cyanurate | 30 |
| Example 4 | 65 | 22 | 8 | 3 | 2 | Melamine cyanurate | 30 |
| Comparative Example 1 | 70 | 20 | 5 | 3 | 2 | — | — |
| Comparative Example 2 | 65 | 22 | 8 | 3 | 2 | Chlorinated paraffin | 15 |
| Comparative Example 3 | 70 | 20 | 5 | 3 | 2 | Chlorinated paraffin | 30 |

Experimental Example (1) Peel strength: Peel strengths of the resin layers were measured according to ASTM D3330. A test was conducted using an eXpert 7600 single column testing machine. After fixing the battery pouch to fixing equipment, the peel strength was measured while peeling off the cured resin layer from the aluminum pouch (subject to be adhered) used for manufacturing the battery cell at a speed of about 300 ram/min and a peeling angle of 180 degrees. Herein, the peel strength may be measured within a range of 0.01 to 0.10 mm in the thickness of the resin layer.

(2) Shear strength: Shear strengths of the resin layers were measured according to ASTM D1002.

(3) Adhesive holding force: Adhesive holding forces of the resin layers were measured according to ASTM D3654. When measuring, a test was performed by setting the load to 1 kg.

(4) Flame retardancy: Flame retardant grades of the resin layers were measured according to UL94 of the UL Plastics Test Method. The resin layers prepared in the examples and comparative examples were formed to have a thickness of about 2 to 3 mm, and a horizontal and vertical length of 200 mm and 50 mm, respectively, to prepare a bar-shaped specimen. The specimen was wound on a mandrel with a diameter of 13 mm, an upper portion was taped, and fixed using a clamp. Then, a flame of 20 mm in length is contacted to the specimen for 10 seconds, and a combustion time t1 and a combustion pattern of the specimen were checked (primary flame contact). Then, when the combustion is finished after the primary flame contact, a combustion time t2 and a glowing time t3 of the specimen after flame contact for 10 seconds were measured again, and the combustion pattern was recorded. By determining the time t1, t2 and t3 and the combustion pattern (whether or not ignition of cotton wool by dripping, combustion up to the clamp, etc.), grades were calculated according to the following standards.

<Flame Retardant Grade>

V0 grade: Individual combustion time t1 or t2 is 10 seconds or less, a total combustion time by pretreatment condition (sum of t1+t2 for 5 specimens) is 50 seconds or less, a combustion and sparking time after secondary flame contact is less than 30 seconds, there is no combustion up to the clamp (125 mm mark), and there is no ignition of the cotton wool by dripping.

V1 grade: Individual combustion time t1 or t2 exceeds 10 seconds but less than 30 seconds, the total combustion time by pretreatment condition (sum of t1+t2 for 5 specimens) exceeds 50 seconds but less than 250 seconds, the combustion and sparking time exceeds 30 seconds but less than 60 seconds, there is no combustion up to the clamp (125 mm mark), and there is no ignition of the cotton wool by dripping.

V2 grade: Individual combustion time t1 or t2 exceeds 10 seconds but less than 30 seconds, the total combustion time by pretreatment condition (sum of t1+t2 for 5 specimens) exceeds 50 seconds but less than 250 seconds, the combustion and sparking time exceeds 30 seconds but less than 60 seconds, there is no combustion up to the clamp (125 mm mark), and there is ignition of the cotton wool by dripping.

(5) Application state: After drying the resin layers, surfaces thereof were visually checked.

o: Non-uniformity was not visually confirmed on the applied surface.

Δ: Nonuniformity was observed locally on the applied surface.

x: Non-uniformity was visually confirmed on the applied surface.

(6) Impact resistance: To measure the impact resistance, the battery cell stack was mounted on a test fixture, then an impact of 500 $m/s^2$ acceleration in a direction of one axis of X, Y and Z axes was repeatedly applied thereto 10 times, and then an impact of 500 $m/s^2$ acceleration in a direction opposite to the same axis was repeatedly applied thereto 10 times. The above process was repeated in directions of the remaining axes. Thereafter, the state of the battery cell stack was visually inspected to evaluate the impact resistance according to the following standards.

o: Crack was not visually confirmed in the resin layer.

Δ: Cracks were observed locally in the resin layer.

x: Cracks were confirmed as a whole in the resin layer.

Experimental results are shown in Tables 2 and 3.

TABLE 2

| Section | Peel strength (gf/in) | Shear strength (kgf/sq-in) | Viscosity (cps, at 160° C.) |
|---|---|---|---|
| Example 1 | 1,500 | 20 | 13,000 |
| Example 2 | 1,800 | 22 | 13,600 |
| Example 3 | 2,100 | 24 | 14,800 |
| Example 4 | 1,700 | 20 | 2,000 |
| Comparative Example 1 | 1,000 | 20 | 11,100 |
| Comparative Example 2 | 700 | 12 | 1,600 |
| Comparative Example 3 | 1,000 | 17 | 8,800 |

TABLE 3

| Section | Flame retardancy | Application state | Impact resistance |
|---|---|---|---|
| Example 1 | VO | ○ | ○ |
| Example 2 | VO | ○ | ○ |
| Example 3 | VO | ○ | ○ |
| Example 4 | VO | ○ | ○ |
| Comparative Example 1 | V2 | ○ | ○ |
| Comparative Example 2 | V1 | X | X |
| Comparative Example 3 | V1 | X | X |

Referring to Tables 1 to 3, it was found from the above results that the resin layers of Examples 1 to 4 exhibited good flame retardancy and application states, and the battery cell stack including the resin layers of Examples 1 to 4 exhibited excellent impact resistance.

In the case of Comparative Example 1 in which a flame retardant was not added, it was found that the application state of the resin layer and the impact resistance of the battery cell stack were good, but the flame retardancy was the lowest among the examples and comparative examples.

In Comparative Examples 2 and 3 in which a halogen flame retardant was added to the resin layer instead of the phosphorus-based flame retardant or nitrogen-based flame retardant, it was found the flame retardancy was normal, but the application state of the resin layer and the impact resistance of the battery module were deteriorated, thus it can be confirmed that it is not suitable as a resin layer including the solvent-free adhesive component.

DESCRIPTION OF REFERENCE NUMERALS

100: battery cell stack
110: battery cell
120: resin layer
130: functional layer

What is claimed is:

1. A battery cell stack comprising:

a plurality of battery cells; and a resin layer which is wholly or partially in contact with a large outer surface of at least one of the plurality of battery cells and which is not in contact with the small side surfaces of the at least one battery cell, wherein the resin layer includes a solvent-free adhesive and a flame retardant, and has a peel strength of 1,000 gf/in to 3,000 gf/in measured according to ASTM D3330, and a shear strength of 20 kgf/sq-in to 100 kgf/sq-in measured according to ASTM D1002, wherein the flame retardant includes at least one of a phosphorus-based flame retardant and a nitrogen-based flame retardant, and wherein the resin layer has a viscosity of 2,000 to 18,500 cps at 160° C.

2. The battery cell stack according to claim 1, wherein the phosphorus-based flame retardant includes a phosphate compound, a phosphonate compound, a phosphinate compound, a phosphine oxide compound, a phosphazene compound, metal salts thereof, or a combination of two or more thereof.

3. The battery cell stack according to claim 1, wherein the nitrogen-based flame retardant includes at least one selected from the group consisting of melamine and melamine derivatives.

4. The battery cell stack according to claim 1, wherein the flame retardant is included in a ratio of 10 to 50 parts by weight based on 100 parts by weight of the resin layer.

5. The battery cell stack according to claim 1, wherein the solvent-free adhesive includes one or more selected from the group consisting of an ethylene vinyl acetate resin, polyamide resin, fatty acid polyamide resin, polyester resin, polyurethane resin, polyolefin resin, styrene resin, and rubber resin.

6. The battery cell stack according to claim 1, wherein the solvent-free adhesive is a pressure sensitive adhesive (PSA).

7. The battery cell stack according to claim 1, wherein the resin layer has an adhesive holding force of 10,000 minutes or more measured according to ASTM D3654.

8. The battery cell stack according to claim 1, wherein the resin layer has a withstand voltage of 10.0 to 30.0 kV/mm measured according to ASTM D149.

9. The battery cell stack according to claim 1, wherein the battery cell stack further comprises a functional layer disposed between the plurality of battery cells, wherein the resin layer is wholly or partially in contact with the functional layer.

10. The battery cell stack according to claim 9, wherein the functional layer includes one or more selected from the group consisting of aerogel, talc, kaolin, alumina, feldspar, pyrophyllite, sericite, mica, elvan, bentonite, sepiolite, diatomite, perlite, fumed silica, silica, glass bubble, glass bead, magnesium hydroxide, calcium carbide, glass fibers, glass wool, rock wool, ceramic wool, nylon, aramid fibers, carbon fibers, polypropylene fibers, polyethylene fibers, polyester fibers, polyurethane fibers, acrylic fibers, polyvinyl chloride acetate fibers, and rayon fibers.

11. A method of manufacturing a battery cell stack, the method comprising:

applying a resin layer on a large outer surface of a first battery cell to bring it wholly or partially into contact therewith without applying the resin layer on small side surfaces of the first battery cell; and stacking a second battery cell on the resin layer, wherein the resin layer includes a solvent-free adhesive and at least one of a phosphorus-based flame retardant and a nitrogen-based flame retardant, and wherein the resin layer has a peel strength of 1,000 gf/in to 3,000 gf/in measured according to ASTM D3330, a shear strength of 20 kgf/sq-in to 100 kgf/sq-in measured according to ASTM D1002, and a viscosity of 2,000 to 18,500 cps at 160° C.

12. The method according to claim 11, wherein the resin layer is applied by spray coating or slot die coating.

13. The method according to claim 11, wherein the application of the resin layer is performed at 140 to 200° C.

* * * * *